3,506,728
REACTIONS OF FLUOROCHLOROETHYLENES
Heinz G. Viehe, Linkebeek, and Serge Y. Delavarenne, Wemmel, Belgium, assignors to Union Carbide Corporation, a corporation of New York
No Drawing. Filed July 24, 1967, Ser. No. 655,286
Int. Cl. C07j 1/02
U.S. Cl. 260—665     1 Claim

ABSTRACT OF THE DISCLOSURE

Fluorochloroethylenes react with lithium amides to form lithium fluorochloroethylenes which are useful for introducing fluorochloroethenyl groups into organic compounds.

---

This invention relates to reactions of fluorochloroethylenes. In one aspect, this invention relates to the reaction of fluorochloroethylenes with lithium amides. In another aspect, this invention relates to a process for introducing fluorochloroethenyl groups into organic compounds. In a further aspect, this invention relates to a process for preparing sulfur-containing fluorochloroethylenes.

In recent years, various articles have been disclosed in the literature relating to the preparation of halogenated lithium organic compounds. For instance, in German Patent 1,215,708 which was granted May 5, 1966, there is disclosed a process for the preparation of lithium derivatives of dichloroethylenes and trichloroethylenes. Similarly, the work of P. Tarrant et al., J. Org. Chem. 28, 839 (1963) disclosed the preparation of trifluorovinyl lithium from trifluorobromoethylene and lithium butyl. Perfluorovinyl lithiums have also been reported by D. Seyferth et al. in J. Am. Chem. Soc. 84, 4266 (1962). However, to date, there is no evidence in the literature of the preparation of lithium haloethylenes wherein two different halogens are present in the same molecule. Moreover, it has not been possible to introduce fluorochloroethenyl groups into organic compounds in a single step with relatively high yields.

It is therefore an object of this invention to provide novel processes involving the use of fluorochloroethylenes. Another object of this invention is to provide a novel process for the preparation of lithium fluorochloroethylenes. A further object is to provide a novel process for introducing fluorochloroethenyl groups into organic compounds. A still further object of this invention is to provide a novel process for the preparation of sulfur-containing fluorochloroethylenes. These and other objects will readily become apparent to those skilled in the art in the light of the teachings herein set forth.

In its broad aspect, the invention relates to a novel process for introducing fluorochloroethenyl groups into organic compounds and to certain novel compositions obtained therefrom. The process comprises contacting the organic compound with a lithium fluorochloroethylene in an inert atmosphere and at a temperature below at least about −60° C.

The lithium fluorochloroethylenes which are employed in the process of this invention can be conveniently represented by the following formula:

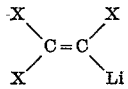

wherein at least one X represents a fluoro group; at least one X represents a chloro group; and the remaining X represents a member selected from the groups consisting of hydrogen, and fluoro or chloro groups.

The organic compound which is contacted with the lithium fluorochloroethylene for introduction of the fluorochloroethenyl group can be one of a wide variety of organic compositions and need only be characterized by the presence of a group capable of reacting with a lithium fluorochloroethylene. Illustrative compounds include, among others those characterized by the presence of unsaturated groups, such as, >C=C<, >C=O, >C=S, >C=N, and the like. Hence, it will readily be apparent that the process of this invention is applicable to a wide range of products such as olefins, ketones, aldehydes, esters, and the like.

In practice, the introduction of the fluorochloroethenyl groups into the organic compound is conveniently effected by contacting the lithium fluorochloroethylene and the organic compound in an inert atmosphere, e.g., nitrogen, at a temperature below at least about −60° C., and more preferably below at least about −75° C., followed by acid hydrolysis.

It is preferred that the reaction be conducted in an inert, normally liquid, organic solvent. Solvents which have been found to be suitable for the process of this invention include hexane, heptane, ethyl ether and the like. Recovery and purification of the desired product can thereafter be effected by known techniques.

The lithium fluorochloroethylene which are employed in the instant invention are prepared by reacting fluorochloroethylenes with lithium amides in accordance with the reaction:

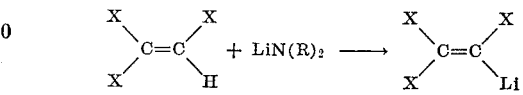

wherein X has the same value as previously indicated and R is alkyl of up to 12 carbon atoms.

It is necessary to conduct the reaction in an inert atmosphere, e.g., nitrogen, and at temperatures below at least about −60° C., and more preferably below at least about 75° C. In practice, it is desirable to conduct the reaction in an inert solvent such as pentane, hexane, toluene, and the like.

In another embodiment this invention relates to the reaction of a fluorochloroethylene with sulfur containing organic compositions. In instance, it has been found that sodium thiophenylate reacts at room temperature with 1,1-dichloro-2-fluoroethylene according to the following reaction:

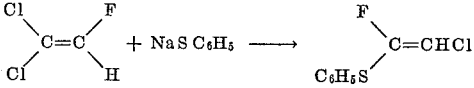

In practice, a solution of 1,1-dichloro-2-fluoro-ethylene in dimethylformamide is added to a suspension of sodium thiophenylate in dimethyl formamide at room temperature. After the reaction is complete, the mixture is heated to remove the solvent, and the product recovered and purified by conventional techniques. The resulting composition is a mixture of cis and trans isomers.

The compositions which can be prepared by the process of this invention are unique in that they contain both fluorine and chlorine atoms on adjacent carbon atoms of an olefinic group. These compositions have been found to be useful in a wide variety of applications. In example, it has been observed that compounds, such as 1-hydroxy-1-(α-fluoro-β,β-dichloro)vinylcyclohexane can be esterified with acids to provide esters having utility as plasticizers for numerous resin systems.

Moreover, due to the presence of the hydroxyl group the compositions react with isocyanates to form urethanes containing both chloro and fluoro groups. Urethanes are themselves of great interest as protective coatings, foams, and the like.

The following examples are illustrative:

EXAMPLE 1

Preparation of lithium 1,1-dichloro-2-fluoroethylene

The lithium derivative of 1,1-dichloro-2-fluoroethylene was prepared at −78° C. under a nitrogen atmosphere by the dropwise addition of a solution of 1.58 grams (0.02 mole) of N,N-diethyllithium amide in 50 milliliters of anhydrous ether to a stirred solution of 2.28 grams (0.02 mole) of the pure olefin in 25 milliliters of the same solvent. The addition was made at such a rate that the variation of the internal temperature of the mixture did not exceed 5°.

EXAMPLE 2

Preparation of 1-hydroxy-1-($\alpha$-fluoro-$\beta,\beta$-dichloro)vinylcyclohexane After standing for 15 minutes there was added to the solution of Example 1, 1.96 grams (0.02 mole) of freshly distilled cyclohexanone over a period of 10 minutes and the reaction mixture allowed to slowly reach room temperature. The solution was then poured into 100 milliliters of a cold 1.5 N HCl solution. The aqueous solution was extracted three times with 50 milliliters of ether and the combined extracts were washed four times with 25 milliliters of water. Thereafter the product was dried over magnesium sulfate. Evaporation of the solvent gave 3.5 grams of a yellow oil which after distillation under vacuo afforded 3 grams (70% yield) of pure 1-hydroxy-1-($\alpha$-fluoro-$\beta,\beta$-dichloro)vinylcyclohexane having a boiling point of 158–160° C. (100 mm. Hg). The product had the following analysis:

Calculated for $C_8H_{11}OFCl_2$ (percent): C, 45.09; H, 5.21. Found (percent): C, 45.12; H, 5.17.

EXAMPLE 3

Preparation of 1-hydroxy-1-($\alpha$-chloro-$\beta,\beta$-difluoro)vinylcyclohexane Using the same experimental conditions as those described in the preceding examples lithium 1,chloro-2,2-difluoroethylene was prepared from N,N-dipropyl lithium amide at −78° C. in ether solution and under a nitrogen atmosphere. From 1.97 grams (0.02 mole) of 1-chloro-2,2-difluoroethylene 3.50 grams of pure 1-hydroxy-1-($\alpha'$-chloro-$\beta,\beta$-difluoro)vinylcyclohexene was isolated after condensation with cyclohexanone. The product was obtained in a yield of 90% and had a boiling point of 72–75° C. The analysis was as follows:

Calculated for $C_8H_{11}ClF_2O$ (percent): C, 48.87; H, 5.64. Found (percent): C, 48.82; H, 6.00.

Although the invention has been illustrated by the preceding examples, it is not to be construed as being limited to the materials employed therein, but rather, the invention encompasses the generic area as hereinbefore disclosed. Various modifications of this invention can be made without departing from the spirit and scope thereof.

What is claimed is:

1. A process for the preparation of lithium fluorochloroethylenes of the formula:

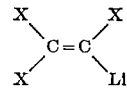

wherein at least one X represents a fluoro group; at least one X represents a chloro group and the remaining X represents a member selected from the group consisting of hydrogen and fluoro or chloro groups which process comprises contacting in an inert atmosphere and at a temperature below at least about −60° C. a lithium amide of the formula:

$$LiN(R)_2$$

wherein R is alkyl of up to 12 carbon atoms with a fluorochloroethylene of the formula:

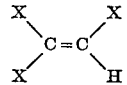

wherein X has the same value as above.

References Cited

Seyferth, Progress in Inorganic Chemistry, vol. III, 1962, Interscience Publishers, New York, N.Y., p. 159.

TOBIAS E. LEVOW, Primary Examiner

A. P. DEMERS, Assistant Examiner

U.S. Cl. X.R.

260—609, 631, 858, 613, 618, 633